United States Patent Office.

HAYDN M. BAKER, OF BROOKLYN, E. D., NEW YORK.

Letters Patent No. 108,089, dated October 11, 1870.

IMPROVEMENT IN THE MANUFACTURE OF ALUMINATE OF SODA.

The Schedule referred to in these Letters Patent and making part of the same.

I, HAYDN M. BAKER, of Brooklyn, E. D., in Kings county and State of New York, have invented a new and useful "Process for the Manufacture of Aluminate of Soda and Aluminate of Potash from Salt-Cake, or Sulphate of Soda, and Sulphate of Potash;" and I hereby declare the following to be a full and exact description thereof.

My invention consists in the employment of anhydrous or hydrated alumina, together with fine coal or other carbonaceous substances, for the purpose of decomposing salt-cake and sulphate of soda, for the production of aluminate of soda; also sulphate of potash, for the production of aluminate of potash.

To enable others to avail themselves of my invention, I will describe the manner of using it.

One should first provide himself with a reverberatory-furnace, like those most generally in use. This furnace should then be brought to and maintained at a full red heat during the time it is employed in manufacturing the aluminate of soda.

After having procured the furnace and brought it to the proper condition for working, mix the following batch, and then charge the same into the said furnace: Terhydrate of alumina, twelve parts; salt-cake, or dry sulphate of soda, six parts; fine anthracite, bituminous, or charcoal, three-quarters part.

When the batch begins to evolve sulphurous acid it should be stirred about and turned over, by the employment of hoes and peels made of iron, so as to expose the entire surface of the mass to the current of air which passes through the furnace, and that has escaped from the fire-room without having formed any chemical combination with the elements of the coal.

Small samples from the batch may be withdrawn from time to time, to determine when the decomposition of the salt-cake or sulphate of soda has been completed.

During the first stages certain portions of the alkaline sulphate become converted into sulphide of sodium, which enters into the igneous fusion, and if a sample of the batch be withdrawn at this stage, it will exhibit a greenish black color; but if the heat be continually applied, and the batch constantly stirred, this color will gradually pass through various shades to a pure white, and when this occurs it may be known that the transformation desired has become complete.

There will now be a mixture of aluminate of soda and free anhydrous alumina left in the furnace, so that, before withdrawing the batch, it is prudent to add sufficient carbonate of soda to form the free alumina into aluminate of soda. Then the batch should be withdrawn and dissolved in water, and the alumina precipitated with carbonic acid, and the clear solution of carbonate of soda decanted or otherwise separated from the precipitated hydrate of alumina, and then evaporated to dryness, when it will be found a good commercial product of carbonate of soda.

The precipitated hydrate of alumina may again be employed, in conjunction with coal, coke, sawdust, and the like, for the decomposition of more sulphate of soda or salt-cake.

The behavior of hydrated and anhydrous alumina, in conjunction with carbon and sulphate of potash, corresponds with its deportment when used with sulphate of soda, as hereinbefore described, except that there is an aluminate of potash formed in this case, instead of aluminate of soda.

Anhydrous alumina and coal, together with sulphate of soda or sulphate of potash, act less perfectly and less rapidly than the hydrates of alumina.

If the foregoing-named batch were placed in a close retort, and subjected to the action of an exalted temperature, the volatile products of the consequent decomposition would be free sulphur, hydrosulphuric, and sulphurous acids; but in a reverberatory-furnace the sulphur produces sulphurous acid as soon as liberated, by combustion, and so also does the hydrosulphuric acid produce sulphurous acid and water by combustion as soon as liberated.

The proportions herein named for the mixing of a batch do not constitute a part of the inventor's claim, as very much more hydrate or anhydrous alumina will make a perfect decomposition of potash or soda sulphates, under the conditions herein described; but this would be an unnecessary use of material, and make a cumbersome mass to handle, while the use of a very much less portion of anhydrous or hydrated alumina than is herein described would only secure a partial decomposition of the sulphates.

The object in inserting these proportions is to show what repeated experiments have demonstrated to be the most practicable.

The advantages of this invention are that it provides a cheap and complete method of decomposing alkaline sulphates.

Claim.

What I claim as my invention, and desire to secure by Letters Patent, is—

Alumina, in conjunction with coal or other substances, for the purpose of decomposing the sulphate of potash and sulphate of soda or salt-cake at exalted temperatures, in the manner herein described, for the production of aluminate of potash and aluminate of soda.

HAYDN M. BAKER.

Witnesses:
GEO. W. PAYNTAR,
E. A. THURSTON.